US008615724B2

(12) United States Patent
Durkan

(10) Patent No.: US 8,615,724 B2
(45) Date of Patent: Dec. 24, 2013

(54) CIRCUIT ASSEMBLY YIELD PREDICTION WITH RESPECT TO FORM FACTOR

(71) Applicant: Flextronics AP, LLC, Broomfield, CO (US)

(72) Inventor: Michael Anthony Durkan, Carrigaline (IE)

(73) Assignee: Flextronics AP LLC, Broomfield, CO (US)

( * ) Notice: Subject to any disclaimer, the term of this patent is extended or adjusted under 35 U.S.C. 154(b) by 0 days.

(21) Appl. No.: 13/656,583

(22) Filed: Oct. 19, 2012

(65) Prior Publication Data

US 2013/0174110 A1    Jul. 4, 2013

Related U.S. Application Data

(63) Continuation of application No. 13/410,202, filed on Mar. 1, 2012, now abandoned.

(60) Provisional application No. 61/581,488, filed on Dec. 29, 2011.

(51) Int. Cl.

| G06F 17/50 | (2006.01) |
|---|---|
| G06F 17/11 | (2006.01) |
| G06F 17/15 | (2006.01) |
| G06F 17/18 | (2006.01) |
| G06F 19/00 | (2011.01) |
| G06F 11/00 | (2006.01) |
| G01R 31/00 | (2006.01) |
| G01R 27/00 | (2006.01) |
| G01R 31/02 | (2006.01) |
| G01R 31/26 | (2006.01) |

(52) U.S. Cl.
CPC ........ *G06F 17/5081* (2013.01); *G06F 17/5009* (2013.01); *G06F 17/11* (2013.01); *G06F 17/15* (2013.01); *G06F 17/18* (2013.01); *G06F 19/00* (2013.01); *G06F 11/008* (2013.01); *G01R 31/003* (2013.01); *G01R 31/02* (2013.01); *G01R 31/26* (2013.01); *G01R 27/00* (2013.01)
USPC .............. 716/56; 716/52; 716/54; 716/112; 716/136; 703/14; 702/59; 702/117; 702/181; 700/110; 714/25; 714/33; 714/741

(58) Field of Classification Search
CPC ......... G06F 17/11; G06F 17/15; G06F 17/18; G06F 17/5081; G06F 17/5009; G06F 19/00; G06F 11/008; G01R 31/003; G01R 31/02; G01R 31/08; G01R 31/26; G01R 27/00
USPC .................. 716/52, 54, 56, 112, 136; 703/14; 702/59, 117, 181; 700/110; 714/25, 33, 714/741
See application file for complete search history.

(56) References Cited

U.S. PATENT DOCUMENTS 6,311,139 B1 * 10/2001 Kuroda et al. ................... 702/81
7,676,775 B2 * 3/2010 Chen et al. ..................... 716/136

(Continued)

OTHER PUBLICATIONS

Gibson, "Statistical Reliability Prediction," IEEE, 1996, p. 161.*

(Continued)

*Primary Examiner* — Phallaka Kik
(74) *Attorney, Agent, or Firm* — Haverstock & Owens LLP

(57) ABSTRACT

Embodiments of the invention include systems and methods for automatically predicting production yield for a circuit assembly according to attributes of its components and defect data mapped thereto. Embodiments receive a proposed design specification for a circuit assembly, including bill of materials (BOM) and schematic data, at a yield prediction environment. The yield prediction environment maps a set of attributes to each component in the BOM and maps a set of possible defects to each component according to its attributes. Defects may be further mapped to a manufacturing process assigned to populate each component in the circuit assembly. The defects are associated with predicted frequencies of occurrence, which can be used to roll up a yield prediction for the circuit assembly. Embodiments further allow "what-if" analysis to be performed so that different yield prediction results can be compared according to different form factor options and/or different manufacturing process options.

20 Claims, 8 Drawing Sheets

(56) References Cited

U.S. PATENT DOCUMENTS

| | | | |
|---|---|---|---|
| 2001/0003427 A1* | 6/2001 | Ferguson et al. | 324/765 |
| 2005/0246590 A1* | 11/2005 | Lancaster | 714/47 |
| 2007/0198548 A1* | 8/2007 | Lee | 707/100 |
| 2008/0301597 A1* | 12/2008 | Chen et al. | 716/5 |
| 2009/0265155 A1* | 10/2009 | Yokogawa | 703/14 |
| 2011/0307752 A1* | 12/2011 | Fujil et al. | 714/731 |
| 2013/0174111 A1* | 7/2013 | Durkan | 716/112 |

OTHER PUBLICATIONS

Tower et al., "Yield Prediction for Flip-Chip Solder Assemblies Based on Solder Shape Modeling", IEEE Transactions on Electronics Packaging Manufacturing, vol. 22, No. 1, Jan. 1999, pp. 29-37.*

Zhou et al., "Yield Prediction Using Critical Area Analysis with InLine Defect Data", 2002 IEEE/SEMI Advanced Semiconductor Manufacturing Conference, pp. 82-86.*

\* cited by examiner

CIRCUIT ASSEMBLY YIELD PREDICTION WITH RESPECT TO FORM FACTOR

CROSS-REFERENCES

This application is a continuation of U.S. patent application Ser. No. 13/410,202, filed on Mar. 1, 2012, entitled "CIRCUIT ASSEMBLY YIELD PREDICTION WITH RESPECT TO FORM FACTOR," claims priority from co-pending U.S. Provisional Patent Application No. 61/581,488, filed on Dec. 29, 2011, entitled "YIELD PREDICTION TOOL," which is hereby incorporated by reference, as if set forth in full in this document, for all purposes.

BACKGROUND

Embodiments relate generally to the field of circuit assembly manufacturing, and more particularly to tools for predicting circuit assembly yields with respect to product form factors.

Electronic devices and systems typically include at least one circuit assembly. The circuit assembly includes a number of circuit components (e.g., discrete components, integrated circuits, circuit sub-assemblies, etc.) that may be coupled to a carrier having conductive and/or non-conductive features (e.g., a printed circuit board (PCB) with traces). The circuit assembly can be manufactured using one or more of a number of different processes. For example, wave soldering, manual soldering, surface mount technology (SMT), and/or other processes can be used to populate electronic components onto a PCB or flexible substrate.

Particularly in high-volume or critical manufacturing applications, it is desirable to predict potential failures in the manufacturing of an electronic assembly that can impact overall product yield, including those attributable to component failures and those attributable to manufacturing process failures. However, yield prediction can be difficult for a number of reasons. For example, each component has various potential failure modes, and those failure modes can change with respect to which manufacturing process is being used to populate that component, where in the process the component is populated to the carrier, spacing and/or placement constraints placed on the component, and/or other design and manufacturing considerations. Further, as component counts increase, the possible failure scenarios for the circuit assembly can increase dramatically. Even further, costs associated with addressing (e.g., repairing or reworking) a failure can vary widely with respect to the types of failure that occurred, the type of component that failed, the type of manufacturing process used to populate that component, where in the process the failure occurred, etc.

Indeed, traditional yield prediction techniques fail to account for many of these factors and have tended to provide unreliable results. For example, many traditional techniques provide crude representations and/or groupings of the components being used in the circuit assembly (e.g., ignoring lead type, pitch, rotation, etc.) and do not account for the type of manufacturing process being used or screening techniques that may be available at different points in the manufacturing process. Further, traditional techniques typically do not account for feedback (e.g., from testing methodologies, actual factory yields, etc.) to tune yield predictions.

BRIEF SUMMARY

Among other things, systems and methods are described for automatically predicting production yield for a circuit assembly according to attributes of its components and defect data mapped thereto. In one embodiment, a proposed design specification for a circuit assembly, including bill of materials (BOM) and schematic data, is received at a yield prediction environment for analysis. The yield prediction environment maps a set of attributes to each component in the BOM and maps a set of possible defects to each component (or component type) according to its attributes. Defects may be further mapped to a manufacturing process assigned to populate each component in the circuit assembly. The defects are associated with predicted frequencies of occurrence, which can be used to roll up a predicted yield (e.g., or remediation cost, etc.) for the circuit assembly. The yield prediction environment further allows "what-if" analyses to be performed so that different yield prediction results can be compared as a function of different form factor options and/or different manufacturing process options.

According to one set of embodiments, a method is provided. The method includes: identifying a design specification for a circuit assembly comprising a plurality of circuit components, each circuit component being populated in the circuit assembly according to the design specification; and, for each of the plurality of circuit components: identifying a set of component attributes corresponding to the electronic component according to an attribute database; assigning a set of possible defects as a function of its respective set of component attributes, each of the set of possible defects being associated with a predicted frequency of occurrence, the predicted frequency of occurrence of at least one defect being a function of spacing or placement of the electronic component; determining, according to the design specification, a predicted spacing or placement of the electronic component with respect to each of a plurality of form factors for the circuit assembly; calculating a first predicted defect frequency for the electronic component as a function of a first form factor for the circuit assembly; and calculating a second predicted defect frequency for the electronic component as a function of a second form factor for the circuit assembly. The method further includes calculating a first yield prediction for the circuit assembly corresponding to the first form factor as a function of the first predicted defect frequencies of the plurality of circuit components; and calculating a second yield prediction for the circuit assembly corresponding to the second form factor as a function of the second predicted defect frequencies of the plurality of circuit components.

According to another set of embodiments, a system is provided. The system includes a design subsystem and a yield prediction subsystem. The design subsystem is configured to generate a design specification for a circuit assembly comprising a number of circuit components, each circuit component being populated in the circuit assembly according to the design specification. The yield prediction subsystem is configured, for each of the plurality of circuit components, to: identify a set of component attributes corresponding to the electronic component according to an attribute database; assign a set of possible defects as a function of its respective set of component attributes, each of the set of possible defects being associated with a predicted frequency of occurrence, the predicted frequency of occurrence of at least one defect being a function of spacing or placement of the electronic component; determine, according to the design specification, a predicted spacing or placement of the electronic component with respect to each of a plurality of form factors for the circuit assembly; calculate a first predicted defect frequency for the electronic component as a function of a first form factor for the circuit assembly; and calculate a second predicted defect frequency for the electronic component as a function of a second form factor for the circuit assembly. The yield prediction subsystem is further configured to: calculate a first yield prediction for the circuit assembly corresponding to the first form factor as a function of the first predicted defect frequencies of the plurality of circuit components; and calculate a second yield prediction for the circuit assembly corresponding to the second form factor as a function of the second predicted defect frequencies of the plurality of circuit components.

BRIEF DESCRIPTION OF THE DRAWINGS

The present disclosure is described in conjunction with the appended figures.

Figure 1:
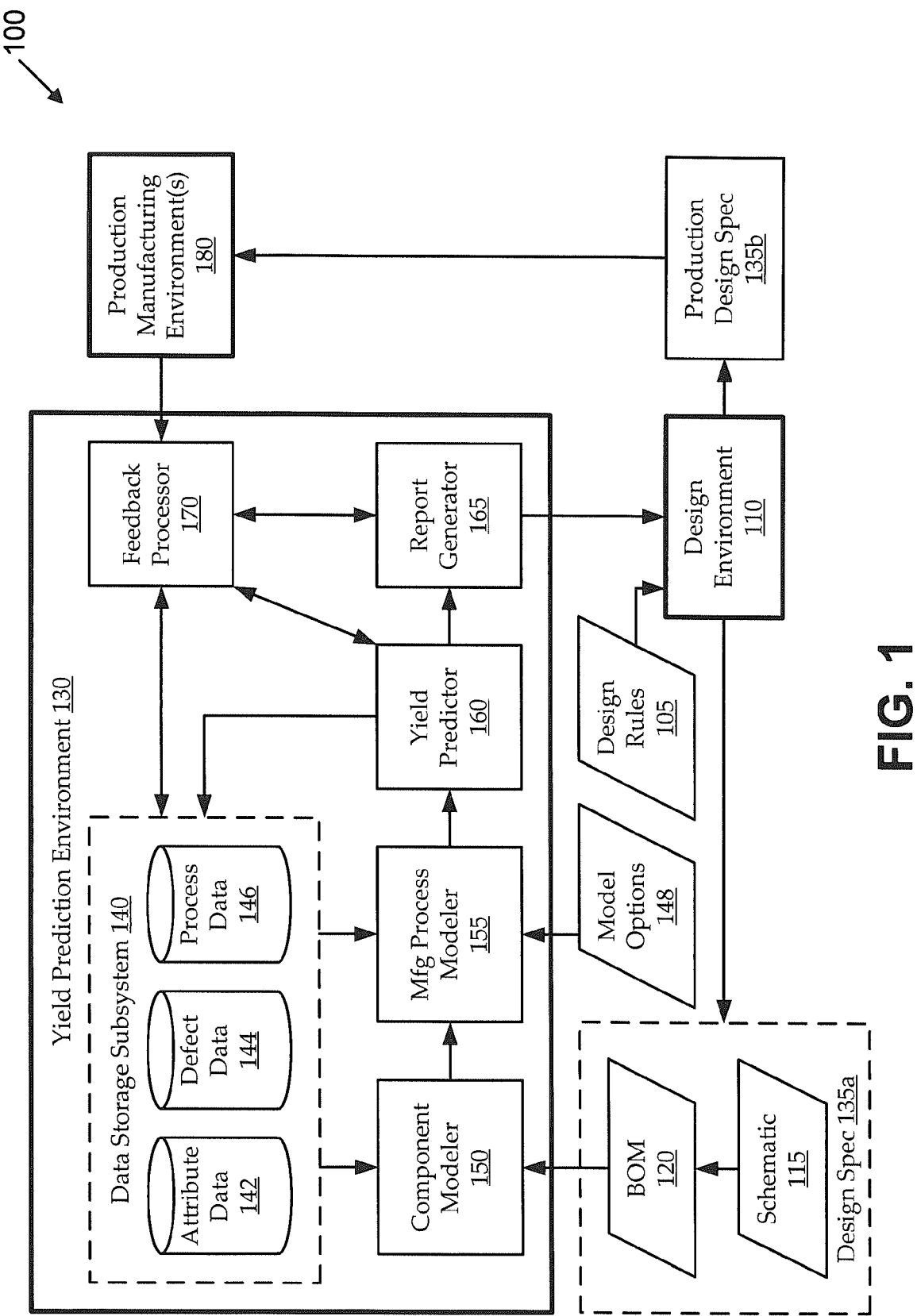
FIG. 1 shows a simplified block diagram of an illustrative production environment to provide context for functionality of various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

It is often desirable to design electronic circuit assemblies with an eye toward the manufacturing environment in which the circuit assembly will be produced. Even a circuit assembly that is designed to have highly reliable electrical functionality may be manufactured in various ways with widely varying practical yields. However, accurately predicting those yields is typically impractical or impossible using traditional yield prediction techniques, which tend to ignore many of the large number of potentially relevant variables. For example, the manufacturing yield for a particular circuit may be appreciably impacted by selections of component parts to perform certain functionality (e.g., component reliability, lead type, packaging constraints, power constraints, etc.), placement and/or arrangement of those components in the circuit assembly (e.g., including rotation and/or pitch of the components), form factor (e.g., size and shape) constraints of the circuit assembly, carrier type (e.g., flexible or rigid printed circuit board, etc.) on which components are populated, manufacturing processes used to populate those components and otherwise manufacture the circuit assembly (e.g., wave soldering, manual soldering, surface mount technology (SMT), gluing, curing, paste printing, reflow, pin-in-paste (PiP), etc.), etc.

Traditional yield prediction techniques fail to account for many of these variables and tend to provide very crude results. For example, traditional techniques tend not to be based on process or screening capabilities of the manufacturing environment and tend not to account for grouping of components, including failing to account for component lead type, pitch, rotation, etc. Further, traditional techniques are generally unable to handle design technology class, unable to import test coverage reports to fine tune yield predictions, unable to unable to configure or account for data collection systems for screening of defects, and unable to meaningfully compare predicted and actual yields. The limitations extend to an inability provide accurate defect frequency predictions by defect for a particular bill of materials (BOM), to assign particular defects to particular packages or processes, to define screening effectiveness according to process options, and to support or exploit standard defect codes, etc. Additionally, the traditional tools employing those techniques tend to provide only a basic and relatively inaccurate yield report as a series of calculations based on a spreadsheet (e.g., Microsoft Excel) template. The limitations of traditional yield prediction techniques are further exacerbated when it is desired to evaluate and compare multiple options for producing a circuit assembly.

Embodiments seek to address some or all of the limitations of traditional yield prediction techniques. Some embodiments provide designers with scientific product yield estimation functionality. This can allow designers to design for a best possible yield based on the BOM only and to design the product towards certain process rules to enable manufacturing to achieve that desired yield, to reliably calculate yield based on a product design and to compare that yield to the BOM-only yield to identify correlations between design choices and yield loss, to visualize negative impacts of yield loss due to non-compliance with design rules, and/or to achieve other functionality. Some embodiments also provide manufacturing with a targeted yield based on the product design for specific process and screening capabilities and the ability to compare those yields for different screening methods, with a target defect frequency prediction (e.g., defects per million opportunities (DPMO)) by component package based on best practices, with estimates of field escapes, with an ability to improve data collection via configuration of a quality system, with an ability to analyze manufacturing quality data (e.g., via a build report) against predicted yields to identify trends that are or are not complying with best practices, and/or with other functionality.

These and other functions are provided by various system and method embodiments described herein. In the following description, numerous specific details are set forth to provide a thorough and enabling understanding of the present invention. However, one having ordinary skill in the art should recognize that the invention may be practiced without these specific details. In some instances, circuits, structures, and techniques have not been shown in detail to avoid obscuring features of the described embodiments.

Turning first to FIG. 1, a simplified block diagram is shown of an illustrative production environment 100 to provide context for functionality of various embodiments. The production environment 100 includes a design environment 110, a yield prediction environment 130, and a production manufacturing environment 180. Each sub environment of the production environment 100 interacts in various ways, as illustrated by select inputs and/or outputs, and may include certain functional components.

As illustrated, a designer uses the design environment 110 to develop a proposed design specification 135a. The proposed design specification 135a is passed to the yield prediction environment 130 for analysis. Output from the yield prediction environment 130 can also be used to affect the design, for example, by passing reports generated by the yield prediction environment 130 back to the design environment 110 for design revision and/or validation. For example, an iterative design cycle may be employed in which proposed design specifications 135a are iteratively tested in the yield prediction environment 130 and revised in the design environment 110 according to the yield predictions in an attempt to reach an optimal production yield under certain constraints. When the desired yield is reached, the proposed design specification 135a becomes the production design specification 135b. The production design specification 135b can then be sent to one or more production manufacturing environments 180 for production of circuit assembly products according to the production design specification 135b. In some embodiments, feedback from the production manufacturing environment 180 is used by the yield prediction environment 130 for further analysis and/or reporting, to further tune the design or component attributes, and/or for other purposes.

Each sub-environment of the production environment 100 can be discussed more fully, in turn, as it relates to functionality of various embodiments. Embodiments of the design environment 110 provide designers with functionality to design a circuit assembly according to design rules 105. For example, the design rules 105 can include global design rule, product-specific design rules, or any other useful design rules. Embodiments include circuit design and/or simulation tools (e.g., software) for selecting electrical components, defining interactions between electrical components, laying out electrical components in the assembly, designing sub-assemblies, testing and simulating virtual circuitry, etc. Outputs of the design environment 110 may include design specifications 135 (e.g., one or more proposed design specifications 135a and a final, production design specification 135b). The design specifications 135 typically include a circuit schematic 115 and a BOM 120.

As used herein, embodiments of circuit assemblies generally include assemblies of electronic components (e.g., and possibly other components, such as mechanical components). The circuit assembly is designed to perform certain functionality, for example, including electrical, mechanical, electromagnetic, hydraulic, and/or other functionality. The electronic components are arranged according to the schematic 115 of the design specification 135. At different stages of the design or manufacturing cycles, the circuit 115 can include different types of information, such as only a theoretical electrical circuit layout at one stage or a complete circuit assembly layout with component placements and part numbers at another stage. The BOM 120 of the design specification 135 can include the raw materials, sub-assemblies, components, etc., and quantities thereof, that are needed to manufacture the circuit assembly according to the design specification 135. As used herein, the term "BOM" is used generally to describe different types of parts lists, depending on the context. For example, the BOM may refer at different stages of the design or manufacture cycles to an engineering, manufacturing, sales, or other type of BOM, and may or may not include attributes, such as electronic component dimensions.

During various phases of the design, the proposed design specification 135a is output from the design environment 110 and provided as an input to the yield prediction environment 130. Embodiments of the yield prediction environment 130 provide automated yield prediction based on a number of different types of inputs. For example, in addition to data included in the received proposed design specification 135a, the yield prediction environment 130 may maintain various types of information in a data storage subsystem 140. In some embodiments, the data storage subsystem 140 includes an attribute data store 142, a defect data store 144, and a process data store 146. The various types of data can be used to model the production environment in support of reliable and realistic yield prediction. This modeling functionality can be provided by a component modeler 150 and a manufacturing process modeler 155.

Embodiments of the component modeler 150 model the components of the circuit assembly, along with any attributes or other information that can be used to improve yield prediction. In some embodiments, the BOM 120 from the proposed design specification 135 is analyzed to generate a proposed parts list. Each part in the parts list is associated with a number of component attributes, which can be retrieved from the attribute data store 142. The attributes may include information, such as lead type, package type, pitch and/or rotation constraints, etc. Attributes may also indicate alternate part options, if needed (e.g., a part providing the same electrical functionality, but with alternate packaging, power constraints, etc.). In some embodiments, the attribute data store 142 includes hundreds or even thousands of attributes for each possible component part.

As discussed above, many real-world, manufacturing-related features can have an appreciable impact on production yield. Embodiments of the manufacturing process modeler 155 seek to model the manufacturing environment to improve yield prediction. Various implementations account for different types of environmental characteristics and use different types of data to provide the modeling functionality. Some embodiments receive a set of model options 148, for example, from a user of the design environment 110, as part of a default configuration, etc. The model options 148 can define various types of threshold values, such as a maximum yield loss before a proposed design specification 135a is rejected. Other model options 148 can include selection of a Design Technology Class, which can impact the type of carrier used for the circuit assembly and the form factor for the circuit assembly, thereby potentially affecting how and where components can be populated. For example, different types of carriers may allow front-side and back-side component placement, the form factor of the carrier may constrain the space, rotation, and pitch of a particular component, etc. Additionally, carrier selection may affect placement of components according to whether the carrier must be allowed to flex in certain locations by certain amounts, may affect which techniques can be used at different stages of production to check for types of defects, may affect which types of manufacturing processes can be used to populate components on the carrier (e.g., some carriers may not be conducive to SMT, PiP, etc.), and/or may affect many other aspects of the design or manufacture of the circuit assembly. The Design Technology Class, or other model options 148, may define further constraints according to the type of technology being produced. For example, in a cell phone application, a circuit assembly may carry certain constraints as to form factor, power usage and heat dissipation, antenna placement and size, chassis grounding and location, cavity placement (e.g., for speakers, microphones, batteries, SIM cards, etc.), etc. On the contrary, a circuit assembly with the same schematic functionality may carry different constraints when produced for a central industrial communications facility.

In addition to using the component parts and attributes modeled by the component modeler 150 and any received model options 148, additional data may be used by the manufacturing process modeler 155. Some embodiments of the manufacturing process modeler 155 model the production process (e.g., the line configuration) using process data from the process data store 146 of the data storage subsystem 140. Process data may be mapped to the components modeled by the component modeler 150 according to their respective attributes. For example, a component type may be associated with a preferred process (e.g., wave soldering, manual soldering, surface mount technology (SMT), gluing, curing, paste printing, reflow, pin-in-paste (PiP), etc.) for its population. This association can, be determined according to its package type, lead type, heat dissipation requirements, manufacturing specifications, or in any other useful way. A circuit assembly having many different components may be produced on a manufacturing line that uses multiple processes to populate the components. For example, a first subset of the components is populated to a printed circuit board using an SMT process, a second subset of the components is populated to the printed circuit board using wave soldering process, and a remaining subset of the components is populated to the printed circuit board using manual soldering.

Some embodiments of the manufacturing process modeler 155 further model aspects of the production according to defect data from the defect data store 144 of the data storage subsystem 140. The defect data can be mapped to various attributes of the selected components of the circuit assembly and/or to various types of manufacturing processes. Mappings between defects and components can include mapping a particular lead type or component package type to a certain predicted frequency of occurrence of a particular defect. Mappings between defects and processes can, for example, include mapping a particular soldering process or other manufacturing process to a certain predicted frequency of occurrence of a particular defect. Further, a particular defect (and a frequency of occurrence) can be mapped to the manufacturing process alone, or in conjunction with the Design Technology Class, form factor, carrier type, component attributes, etc. The defect occurrence frequencies can be derived from testing, prediction models, manufacturing specifications, assumed default values, manufacturing feedback, or in any other useful way. In some implementations, the defect occurrence frequencies can be expressed in terms of defects per million opportunities (DPMO), which can be calculated as 1,000,000 times the number of defects divided by the product of the number of components and the number of opportunities per component. For example, the circuit assembly has five of a particular discrete component of size "0805" with "wraparound" leads providing a total pin count of 800 pins. When populated using its preferred default process of SMT, the defect data predicts 20,025 defects per million; when populated using wave soldering, the defect data predicts 24,030 defects per million; and when populated using manual soldering, the defect data predicts 6,007,500 defects per million. However, there may only be one opportunity per component for the defect (or multiple concurrent defects) to occur in an SMT or wave soldering processes, while there may be an opportunity for a defect with each pin when manual soldering processes are used. Accordingly, the DPMO for the component may be calculated as 4,005, 4,806, and 7,509 for the SMT, wave soldering, and manual soldering processes, respectively.

In some embodiments, the defect data store 144 includes standard defect codes to facilitate mapping of defect data. For example, as described above, implementations can map defect codes to certain manufacturing processes and/or to certain component packages (e.g., or other attributes). Certain embodiments of the manufacturing process modeler 155 further model screening processes. For example, at different stages in the production of the circuit assembly, it may be possible to screen for various defects in one or more ways, including optically, electrically, mechanically, etc. As the circuit assembly moves through the production line, certain defects may become easier or more difficult to detect. Further, the particular stage of production at which the defect is detected may affect whether and how the defect can be addressed and/or the costs associated with addressing the defect. For example, addressing a defect may involve different amounts and techniques of repair, rework, etc., which can be associated with costs. In various embodiments, defect codes (e.g., standard defect codes) can be mapped to screening processes, screening process defect codes can be mapped to component packages, component packages can be mapped to screening processes, etc. Data relating to screening processes, manufacturing processes, and the like may be stored in the process data store 146 of the data storage subsystem 140.

Embodiments of the manufacturing process modeler 155 output a proposed line configuration, or the like, with a defined set and/or sequence of process flow stages. Some or all of the stages have associated component placements, associated screening processes, associated potential defect types and occurrence frequencies, etc. In one illustrative line configuration, the circuit assembly passes in turn through a PiP system for paste printing, a system for top-side chip placement, a reflow system, a system for bottom-side chip placement and adhesion, a manual placement system, a wave soldering system, a manual soldering system, and a cleaning and finishing system.

Model information coming from the manufacturing process modeler 155 and the component modeler 150 can be considered as forming a comprehensive model of real-world production data for the circuit assembly, at least as it potentially affects production yield. This data can then be used by a yield predictor 160 of the yield prediction environment 130 to make different types of production yield predictions. Some embodiments of the yield predictor 160 can further use the data to suggest certain modifications to the design of the circuit assembly, the manufacturing processes, the screening processes, and/or other aspects of the line configuration.

The yield predictor 160 can generate many different types of data. For example, as discussed above, the manufacturing process modeler 155 can map different data to form defect occurrence frequency estimates. Those estimates can then be rolled up to calculate predicted defects for a total production run for the circuit assembly, for a particular defect type, for a particular component or component package type, for a particular form factor or Design Technology Class, for a particular manufacturing process or line configuration, for a particular screening process, etc. Some implementations allow drilling down of yield estimates to look at DPMOs or estimated yield effects per defect type (e.g., component placement defect, electrical termination defect, etc.), per component, per assembly, etc.

According to some embodiments, the yield predictor 160 generates a set of yield predictions based on variable conditions. In one example, as discussed above, the manufacturing process modeler 155 can generate different mapping data for components according to the form factor in which they are being placed. It may be desirable to generate a set of yield prediction results, each corresponding to a different form factor. In another example, as discussed above, the manufacturing process modeler 155 can generate different mapping data for components according to which manufacturing processes are used to populate which components of the assembly. It may be desirable to generate a set of yield prediction results, each corresponding to a different set of manufacturing processes (e.g., where each component or package type is associated with a preferred manufacturing process and one or more alternate manufacturing processes).

As illustrated, embodiments of the yield prediction environment 130 also include a report generator 165. Results from the yield predictor 160 can be sent to the report generator 165 for various types of reporting. For example, the report generator 165 can generate human-readable reports, machine-readable reports, raw data, etc. Some embodiments are configured to generate graphical reports and/or tables showing first pass yield predictions, critical non-compliance defects, non-preferred defects, DPMO values, component part attributes, production line configuration information and/or settings, screening process information, defect types, and/or any other useful information. Certain implementations also report various costs. For example, the yield prediction data can be used to derive costs associated with overall yield loss, costs to repair particular defect types at particular process stages, cost comparisons between form factors or manufacturing process selections, cost comparisons between component selections, etc.

In some embodiments, data from the yield predictor 160 can also be fed back to the data storage subsystem 140 to modify one or more types of data. Further, data from the yield predictor 160 and/or reporting data from the report generator 165 can be fed back to the design environment 110. The data can be used by designers and/or automatically by the design environment 110 to tune design parameters according to the yield prediction results. The updated design parameters can be reflected in a revised proposed design specification 135a. If it is determined that the yield prediction results are satisfactory (e.g., there is a satisfactory option for a line configuration to produce circuit assemblies at a satisfactory yield), the information, including the most recent proposed design specification 135a, can be promoted as the production design specification 135b. It will be appreciated that the production design specification 135b may include different and/or additional information as compared to the proposed design specification(s) 135a. For example, the production design specification 135b may not include an electrical schematic and, instead, may include CAD drawings or numerical control code, manufacturing system settings, test parameters and procedures, etc.

One or more production manufacturing environments 180 produces the circuit assembly products according to the production design specification 135b. As part of production, the production manufacturing environment(s) 180 record and maintain various types of information. For example, a production manufacturing environment 180 can track actual yields over time, defects detected by screening processes, etc. In some implementations, the production manufacturing environment(s) 180 use standard defect codes that can easily be traced back to information used in the yield prediction environment 130. The defect data, actual yield data, and/or any other useful data can be fed back to the yield prediction environment 130 to support various functions.

As illustrated, the yield prediction environment 130 may include a feedback processor 170. Embodiments of the feedback processor 170 receive feedback data from the production manufacturing environment(s) 180 and pass the data to any or all of the yield predictor 160, the report generator 165, and the data storage subsystem 140. For example, feedback data can be applied to data in the defect data store 144 to tune defect predictions, feedback data can be used by the report generator 165 to report predicted versus actual yields or predicted versus actual costs, etc.

Figure 2:
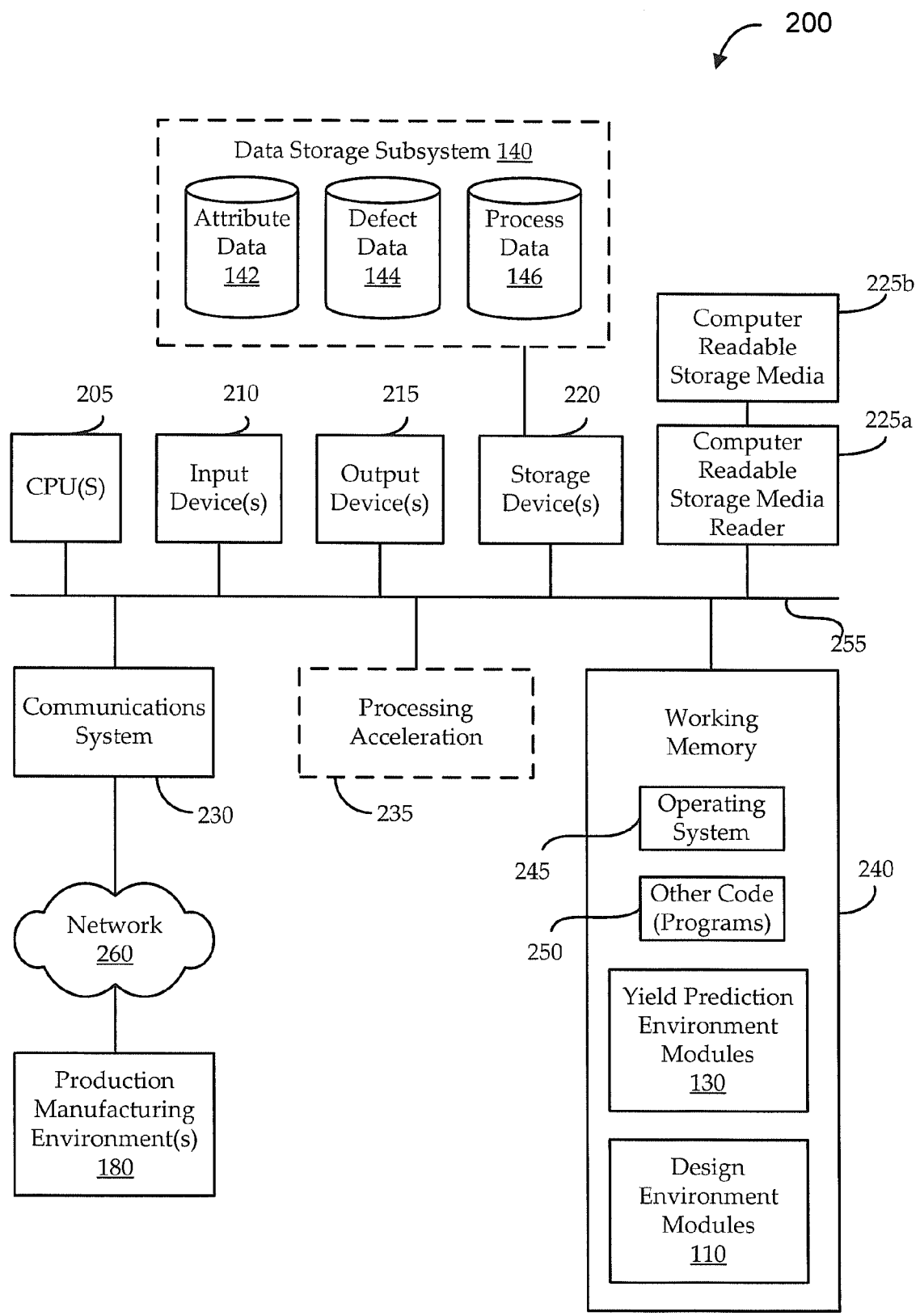
FIG. 2 shows an exemplary computational environment, in the context of which various embodiments may be implemented.

It will be appreciated that functionality of the production environment 100, and its component sub-environments and functional component parts, can be implemented in various ways. FIG. 2 shows an exemplary computational environment 200, in the context of which various embodiments may be implemented. The computational environment 200 may be implemented as or embodied in single or distributed computer systems, or in any other useful way. The computational environment 200 is shown including hardware elements that may be electrically coupled via a bus 255.

The hardware elements may include one or more central processing units (CPUs) 205, one or more input devices 210 (e.g., a mouse, a keyboard, etc.), and one or more output devices 215 (e.g., a display device, a printer, etc.). The computational environment 200 may also include one or more storage devices 220. By way of example, storage device(s) 220 may be disk drives, optical storage devices, solid-state storage device such as a random access memory (RAM) and/or a read-only memory (ROM), which can be programmable, flash-updateable, and/or the like. For the sake of illustration, the storage device(s) 220 can include some or all of the data storage subsystem 140 (e.g., the attribute data store 142, the defect data store 144, and/or the process data store 146).

The computational environment 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computational environment 200 may also include a processing acceleration unit 235, which can include a DSP, a special-purpose processor, and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer described above with respect to the computational environment 200.

The computational environment 200 may also include software elements, shown as being currently located within a working memory 240, including an operating system 245 and/or other code 250, such as an application program (which may be a client application, web browser, mid-tier application, RDBMS, etc.). As illustrated some or all of the functionality of the design environment 110 and the yield prediction environment 130 can be implemented as one or more modules in working memory 240. In some embodiments, various data is communicated with other systems, like one or more production manufacturing environments 180, via a network 260.

It should be appreciated that alternate embodiments of a computational environment 200 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 200 may include code 250 for implementing embodiments of the present invention as described herein.

The systems described above with reference to FIGS. 1 and 2 are intended to provide an enabling context in which certain embodiments can be implemented. The same and/or other functionality is described with reference to various method embodiments below in FIGS. 3-7. Any descriptions of those method embodiments that reference particular system components are intended only to add clarity to the description and should not be construed as limiting the scope of those embodiments.

Figure 3:
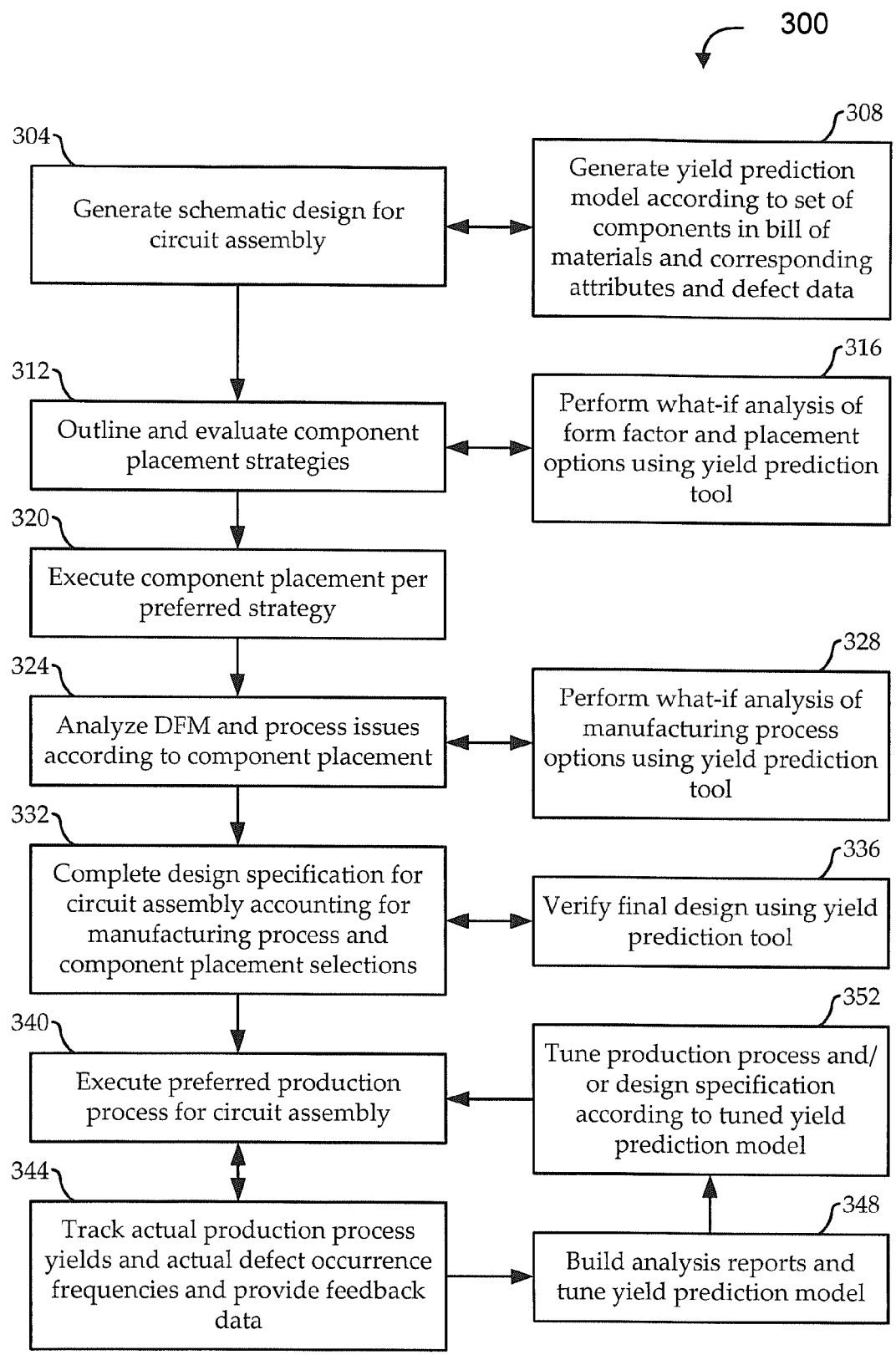
FIG. 3 shows a flow diagram is shown of an illustrative method for using yield prediction in various stages of design and manufacture of a circuit assembly, according to various embodiments.

Turning to FIG. 3, a flow diagram is shown of an illustrative method 300 for using yield prediction in various stages of design and manufacture of a circuit assembly, according to various embodiments. The method 300 begins at blocks 304 by generating a schematic design for the circuit assembly. As discussed above, the output of block 304 may include a design specification having schematic information and BOM information. The design specification data can be sent to a yield prediction environment (e.g., yield prediction environment 130 of FIG. 1), that may include various types of modeling capabilities and data to support those capabilities. For example, embodiments include a component modeler for modeling components of the BOM along with their relevant attributes and a manufacturing process modeler for modeling a line configuration and screening processes and for mapping defect data. The various models can all be considered part of a yield prediction model that is used by the yield prediction environment to perform its yield prediction functionality.

At block 308, the yield prediction model is generated according to set of components in the BOM and corresponding attributes, defect data, process data, and/or any other useful data. Generating the yield prediction model can involve an iterative process between design functions and yield prediction functions. Further, the yield prediction model can be generated automatically as a function of the design specification and data maintained by the yield prediction environment, or portions of the model may be generated or adjusted manually. Further, the yield prediction model typically changes over the course of the design cycle to accommodate new information and new types of information. For example, depending on the phase of the design cycle, the yield prediction model may include basic BOM information, complete parts list information with attributes, CAD data showing component placements, line configuration data, screening process data, etc.

At block 312, component placement strategies are outlined and evaluated. This may include auto-populating components according to defined rules (e.g., electrical and space constraints) and/or defining placement rules (e.g., defining a Design Technology Class, carrier type, form factor, etc.). In some embodiments, various options are outlined and evaluated at block 312. For example, various form factor options are provided either manually or according to attribute or other data maintained by the yield prediction environment. At block 316, the yield prediction environment can be used to perform a "what-if" analysis of the various form factor options and/or placement options. For example, each form factor option may allow for different placement configurations and/or may affect the types of defects predicted, the frequency at which those defects are expected to occur, the types of screening processes available for detecting those defects, the costs associated with repairing or reworking those detected defects, etc. Reports may be generated to facilitate comparison of the different yield prediction results.

Embodiments may allow for manual or automated selection of a preferred component placement strategy according to the yield prediction results. The preferred component placement strategy can include information generated in support of analyzing that strategy. For example, the preferred component placement strategy data can include CAD data for component placements, component attributes, yield prediction information, proposed line configurations and/or screening processes, etc. At block 320, the preferred component placement strategy is used to execute component placement. As discussed above, some embodiments execute the component placement as part of the yield prediction environment (e.g., as part of generating the yield prediction model). In other embodiments, relevant information is passed back to the design environment and designers and/or automated design systems execute the component placement in accordance with the preferred strategy. Notably, some or all of blocks 312-320 can be implemented as an iterative process (e.g., that may involve one or both of the yield prediction and design environments) that seeks to converge on an optimal component placement.

In some embodiments, at the stage in the process where component placement is occurring, design for manufacture (DFM) issues may be largely ignored. For example, component placement design and/or execution may be carried out according to blocks 312-320 in such a way that is optimal with respect to proximity to other components, form factor, Design Technology Class, carrier type, etc.; though the placement takes little or no account of which manufacturing processes will be used for component population, potential screening processes, manufacturing line design and layout (e.g., order and/or placement of different systems in the production manufacturing environment 180, etc.

Accordingly, a next stage of the design process may focus on DFM and related issues. At block 324, DFM and other process issues are analyzed according to the now-executed component placement. As discussed above, manufacturing processes can be assigned for each component, each component type, each packaging type, each sub-assembly, or in any other useful way. Defects can also be mapped to various manufacturing process steps or other relevant data. In some embodiments, screening processes are assigned to detect defects at various stages of the production process.

Certain implementations consider various process options that are provided either manually or according to attribute or other data maintained by the yield prediction environment. Each component may be associated with a preferred (i.e., first choice) manufacturing process for use in populating the component, as well as with one or more alternate manufacturing processes. For example, it may be preferable to populate a particular component type using an SMT process, though it is also possible to populate the same component using wave and/or manual soldering processes. At block 328, the yield prediction environment can be used to perform a "what-if" analysis of the various manufacturing process options. Each process option may be associated with a different predicted frequency of defect occurrence. Further, different process options may allow for different types of screening, which may affect the cost of remediation of any detected defects, as well as potentially affecting yield loss. Evaluating the various options at block 328 may involve comparing the different options with respect to estimated yield, defect types, cost of defect remediation, cost of manufacture (e.g., where different manufacturing processes can be performed at different speeds, costs, etc.), etc. Reports may be generated to facilitate comparison of the different yield prediction results according to the different process options.

Embodiments may allow for manual or automated selection of a preferred design specification according to the yield prediction results. The preferred design specification strategy can include any useful information generated in support of analyzing that strategy. For example, the preferred component placement strategy data can include CAD data for component placements, component attributes, yield prediction information, proposed line configurations and/or screening processes, etc. At block 332, the preferred design specification is used to generate or settle on a final proposed design specification (e.g., automatically and/or as part of a manual design environment process). Some or all of blocks 324-332 can be implemented as an iterative process (e.g., that may involve one or both of the yield prediction and design environments) that seeks to converge on an optimal final design that accounts for DFM-related concerns.

In some embodiments, the final proposed design specification is promoted as the production design specification and is communicated to one or more production manufacturing environments 180 for execution at block 340. In other embodiments, the final proposed design specification, with all its associated component, process, and screening data, is passed through the yield prediction environment again for final evaluation and assessment at block 336. In some cases, the assessment at block 336 provides an opportunity to fine tune the design specification. For example, component placements may be adjusted, screening processes may be evaluated, etc. The interaction between blocks 332 and 336 may, thus, involve one or more iterations. The final assessment may also be the stage in the design process at which costs are finally evaluated, in implementations where those costs are not addressed previously. In other cases, the assessment at block 336 is used to generate a final report of yield predictions and related production design specification data (e.g., including cost predictions, line configurations, CAD models, etc.). Having finalized the design and reported the final prediction and specification data, the resulting production design specification is communicated to one or more production manufacturing environments 180 for execution at block 340.

As discussed above, some embodiments use feedback from the production manufacturing environments 180 for various purposes. For example, the feedback data can be used to tune (e.g., update, modify, etc.) yield prediction models, defect models, screening processes, line configurations, etc. In some embodiments, at block 344, actual production process yields and/or actual defect occurrence frequencies are tracked, and feedback data is provided back to the yield prediction environment. At block 348, the feedback data can be used to build analysis reports, tune yield prediction models, etc. In some implementations, the feedback data is further used to tune production processes and/or design specifications according to the tuned yield prediction model and/or other data at block 352. As illustrated, the tuned yield prediction model and/or other data may result in an update or revision to the production design specification. Accordingly, the method 300 may iterate to block 340 to execute production of the circuit assembly according to the most recent production design specification.

Figure 4:
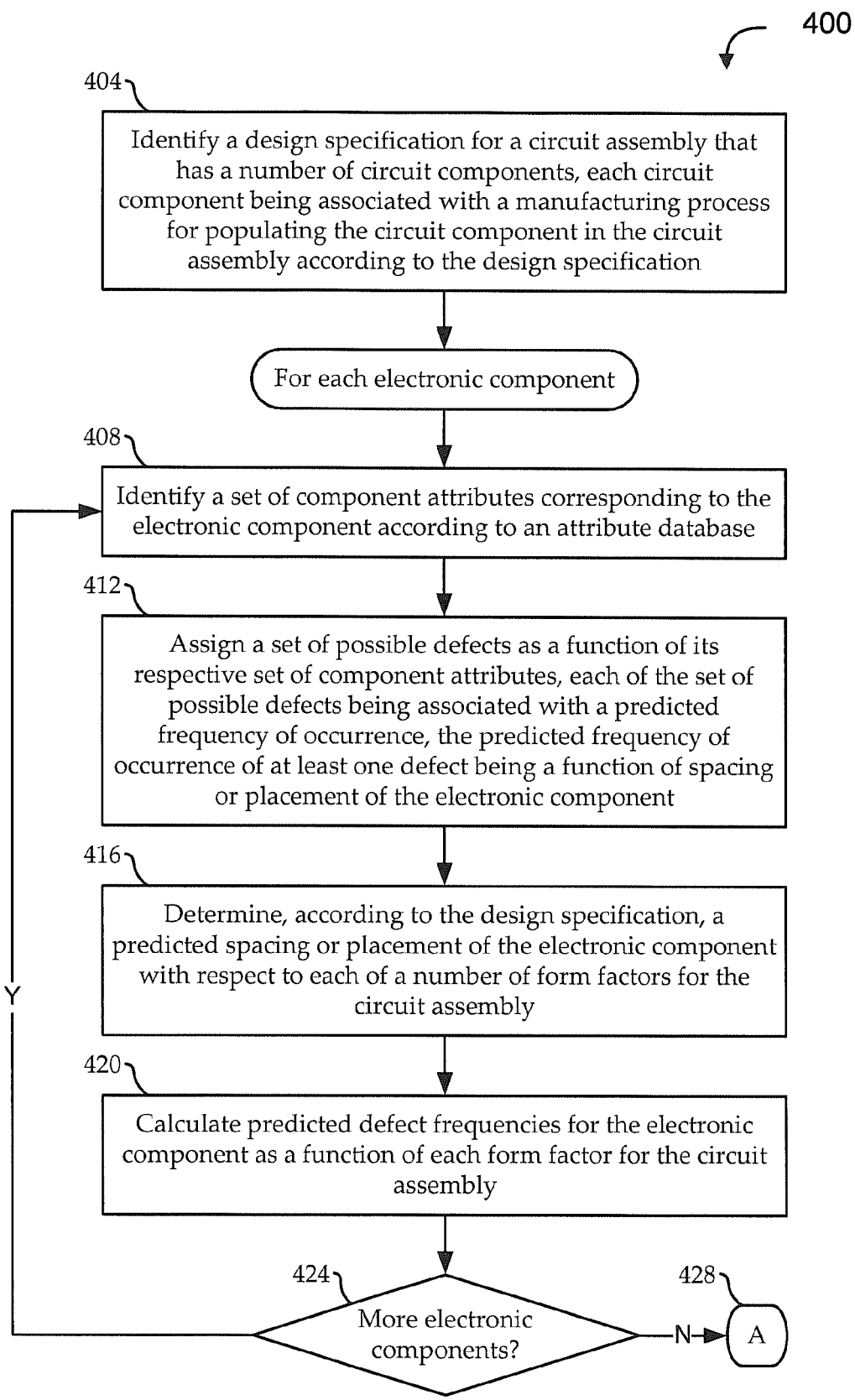
FIGS. 4 and 5 show flow diagrams of two portions of an illustrative method for providing yield prediction functionality with respect to form factor options, according to various embodiments.
Figure 5:
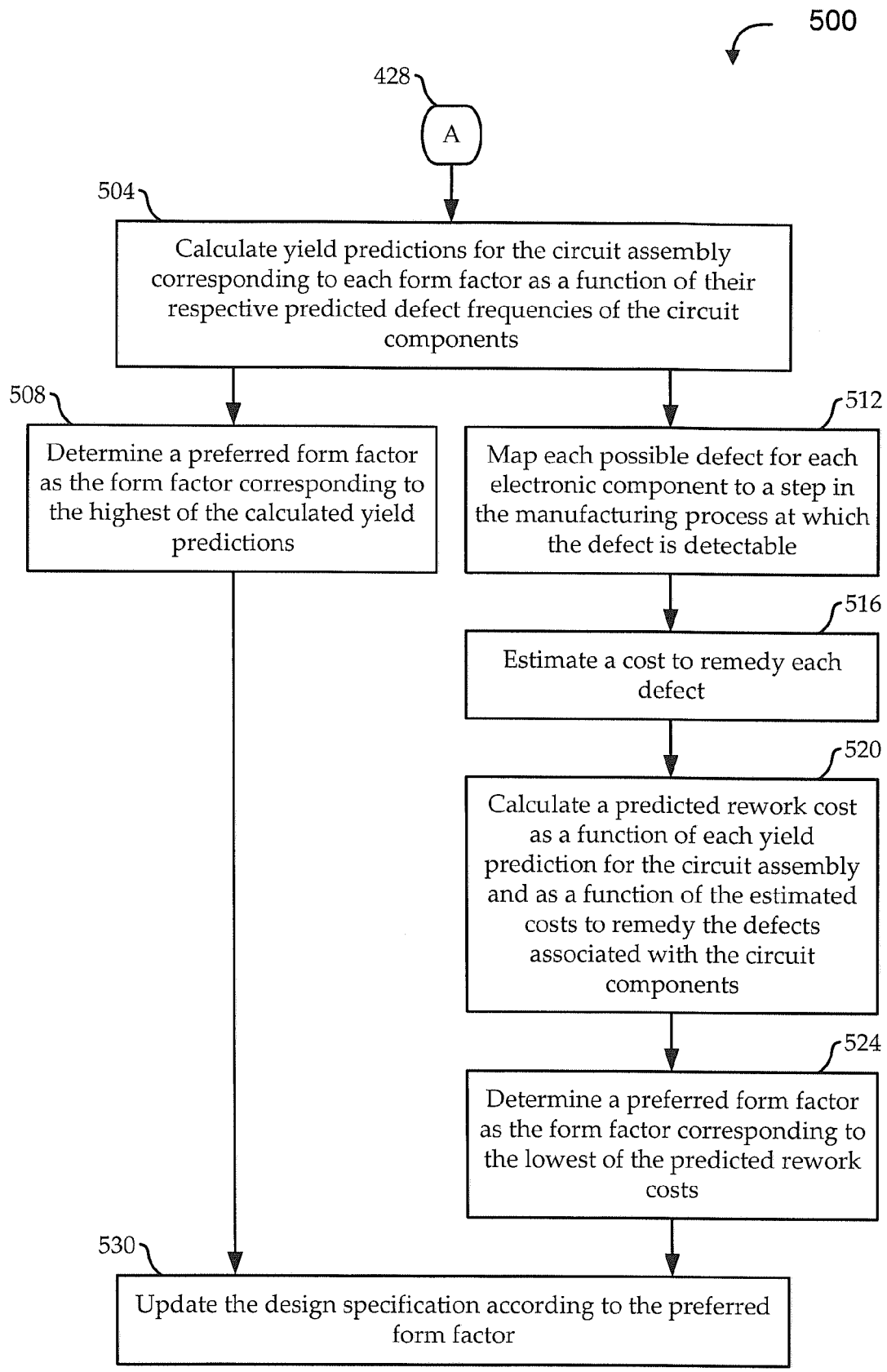

As discussed above, some embodiments (e.g., of block 316) provide functionality to facilitate "what-if" types of analyses of yield predictions according to different form factor options. FIGS. 4 and 5 show flow diagrams of two portions of an illustrative method 400 for providing yield prediction functionality with respect to form factor options, according to various embodiments. The method 400a begins at block 404 by identifying a design specification for a circuit assembly that has a number of circuit components to be populated in the circuit assembly according to the design specification. For example, referring to FIG. 1, the design specification may be a proposed design specification 135a that is identified by (e.g., passed to) the yield prediction environment 130.

The remainder of the first part of the method 400a (i.e., blocks 408-424) may iterate for each electronic component. At block 408, embodiments identify a set of component attributes corresponding to the electronic component according to an attribute database. For example, each electronic component in the BOM 120 of the proposed design specification 135a is mapped by a component modeler 150 of the yield prediction environment 130 by associating the electronic component with a set of attributes maintained in an attribute data store 142.

At block 412, embodiments assign a set of possible defects to the electronic component as a function of its respective set of component attributes identified in block 408. Each of the set of possible defects can be associated with a predicted frequency of occurrence (e.g., a DPMO). In context of the method 400, it is assumed that the predicted frequency of occurrence for at least one defect is a function of spacing or placement of the electronic component. In other words, placement of the same component in two different form factor environments (e.g., according to two different Design Technology Classes) is predicted to yield two different frequencies of occurrence for that at least one defect.

At block 416, a predicted spacing or placement of the electronic component is determined, according to the design specification, with respect to each of a number of form factors for the circuit assembly. For example, different space constraints associated with the different form factors may allow components to be spread out, placed in different locations or arrangements, etc. Notably, different component placement may also affect what types of packaging can be used for the components, what manufacturing processes can be used, what associated connections may be required, etc. Some or all of these factors may be reflected in the different predicted frequency of occurrence for the at least one defect with respect to form factor.

At block 420, embodiments calculate predicted defect frequencies for the electronic component as a function of each form factor for the circuit assembly. This may involve separate calculations for each component, each component type, each sub-assembly, etc. A determination can be made at block 424 as to whether more components remain to be evaluated. If so, the method 400a may return to block 408 to evaluate the next component or component type (e.g., in the BOM 120). If no more components remain to be analyzed, embodiments continue to reference "A" 428, which points to the second portion of the method 400b shown in FIG. 5.

Turning to FIG. 5, embodiments of method 400b continue (after reference 428) at block 504 by calculating yield predictions for the circuit assembly corresponding to each form factor as a function of their respective predicted defect frequencies of the circuit components. This may involve rolling up component-level (or sub-assembly-level) yield predictions (e.g., from block 420 of FIG. 4) to predict the assembly-level yield. Further, as discussed above, this may involve rolling up different types of yield predictions, each focused on a category of defect (e.g., placement defect, connection defect, etc.).

Various embodiments account for different factors to determine a preferred form factor according to the yield predictions. Some embodiments, as illustrated by block 508, determine a preferred form factor as the form factor corresponding to the highest of the calculated yield predictions. For example, if a first form factor is associated with a 90-percent yield, and a second form factor is associated with an 84-percent yield, the first form factor is selected as the preferred form factor. Other embodiments account for cost differences, as illustrated by blocks 512-524. At block 512, each possible defect for each electronic component (e.g., or at least a portion thereof) is mapped to a step in the manufacturing process at which the defect is detectable. The different defects can then be analyzed to estimate a cost to remedy (e.g., repair, rework, etc.) the defect at block 516. At block 520, embodiments calculate a predicted remediation cost as a function of each yield prediction for the circuit assembly and as a function of the estimated costs to remedy the defects associated with the circuit components. This results in a predicted cost due to defects for each form factor option. At block 524, embodiments determine a preferred form factor as the form factor corresponding to the lowest of the predicted remediation costs.

It is worth noting that any roll-up calculation, or the like, can involve techniques to avoid double-counting and other potential sources of error. Suppose, for example, that a particular component is misplaced and also connected improperly. It may be desirable in one instance to predict and/or track each of defect to maintain an accurate understanding of rolled-up defect occurrences (or predictions) by type. It may be desirable in another instance to predict and/or track each of defect to maintain an accurate understanding of rolled-up costs of the respective defects, different screening options, etc. However, in another instance, it may be desirable to count all defects affect the same component as a single defective component. For example, if the component has to be replaced and repopulated either way, it may be irrelevant in certain contexts whether the component had one or multiple associated defects.

Having determined the preferred form factor (e.g., by block 508 or by blocks 512-524), embodiments update the design specification according to the preferred form factor. For example, as described above, component placement may be performed manually and/or automatically to fit the preferred form factor. Further, other changes may be required, desirable, or possible according to the preferred form factor. For example, a larger form factor may allow for different options with respect to connections between components, placement of electromechanical elements, placement or arrangement of antennas and the like, etc. On the other hand, different component spacings and carrier sizes may change electrical properties, such as propagation delays, mutual inductances, parasitic capacitances, etc. Accordingly, updating the design specification can include changes to the BOM, changes to component placements, changes to schematic diagrams, etc.

Figure 6:
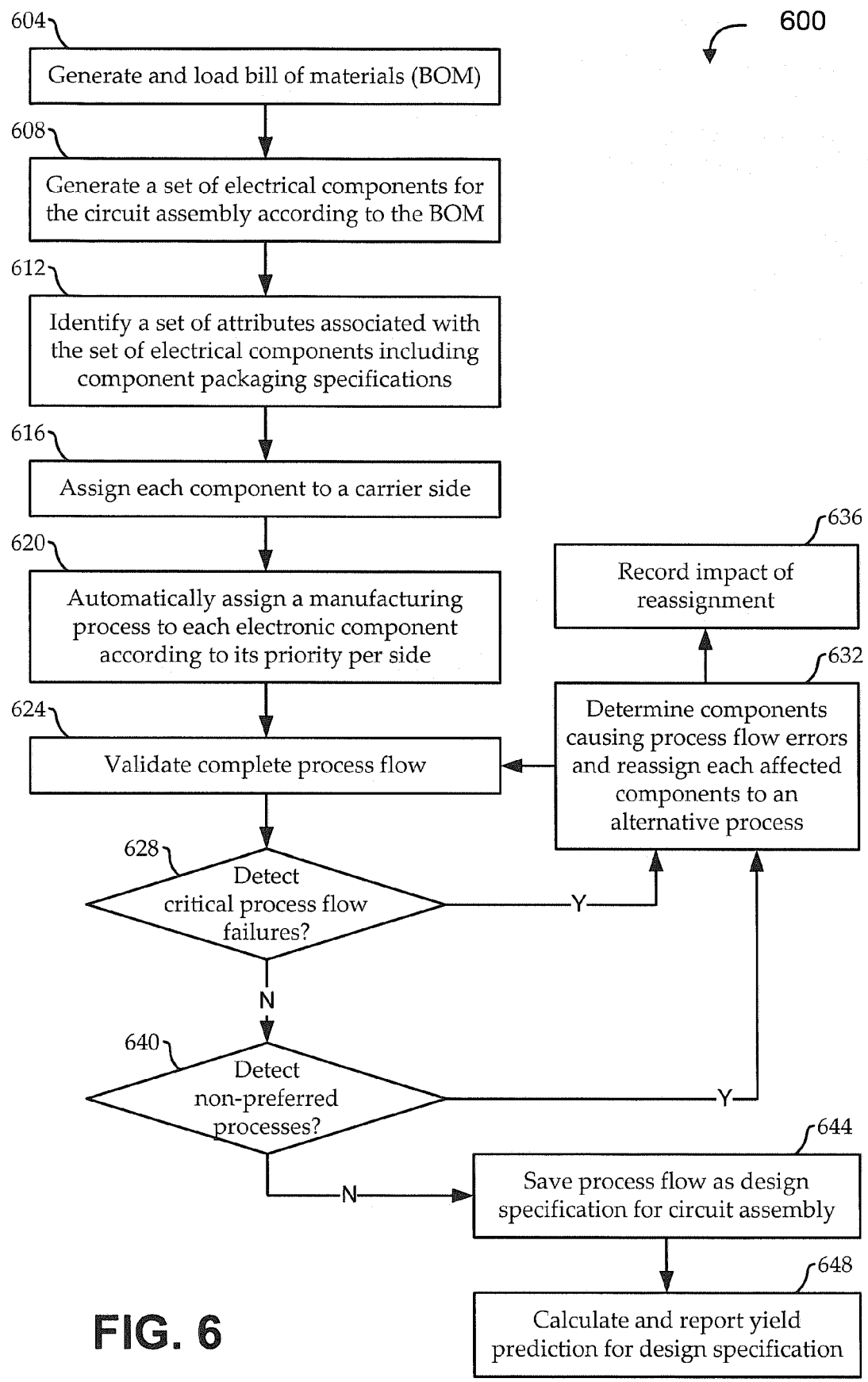
FIG. 6 shows a flow diagram of an illustrative method for providing yield prediction functionality with respect to manufacturing process options, according to various embodiments.

As discussed above, some embodiments (e.g., of block 328 or 336) provide functionality to facilitate "what-if" types of analyses of yield predictions according to different manufacturing process options. FIG. 6 shows a flow diagram of an illustrative method 600 for providing yield prediction functionality with respect to manufacturing process options, according to various embodiments. Embodiments begin at block 604 by generating and/or loading a BOM (e.g., 120). At block 608, the BOM is used to generate a set of electrical components for the circuit assembly. A set of attributes is identified at block 612 in association with the set of electrical components including component packaging specifications.

In some embodiments, it is assumed that the components have been places (e.g., according to FIGS. 4 and 5). In other embodiments, components are placed as part of the method 600 either completely or at least to an extent needed to predict manufacturing assignments as discussed more below. For example, at block 616, each component is assigned to a carrier side and/or is assigned a priority. At block 620, embodiments automatically assign a manufacturing process to each electronic component according to its priority per side. For example, each component is associated with a preferred (i.e., first choice) manufacturing process that is used for the automatic assignment (at least for the first pass).

The method 600 then determines whether any issues exist with the first-pass manufacturing process assignments, and may reassign any processes causing undesirable effects, where possible. At block 624, the process flow is validated. For example, a line configuration is attempted according to the process assignments or various techniques are used to determine whether the current assignments result is a valid manufacturing process flow. At block 628, a determination is made as to whether any critical process flow failures are detected. If so, any components causing process flow errors are determined, and those components are reassigned, if possible, to an alternative process at block 632. For example, each component may be further associated with a second choice manufacturing process. If a reassignment occurs (or cannot occur), impacts are recorded at block 636. For example, the yield prediction model can be updated, the design specification can be adjusted, a log entry can be created, etc. The process flow may then be revalidated at block 624 accounting for any reassignments.

If no critical process flow failures are detected at block 628, a further determination is made at block 640 as to whether any non-preferred process flows are detected. If so, any components causing non-preferred process flows are determined, and those components are reassigned, if possible and desirable, to an alternative process at block 632. As with detected critical process flow failures, impacts of any reassignments (or decisions not to reassign) are recorded at block 636, and process flow may be revalidated at block 624 accounting for any reassignments.

When validation (or revalidation) at block 624 results in no critical process flow failures being detected at block 628 and no non-preferred process flows being detected at block 640, embodiments save the process flow as the design specification for the circuit assembly at block 644. At block 648, embodiments calculate and report a yield prediction for design specification. As discussed above, each component can be associated with a predicted frequency of occurrence for one or more defects, and those predicted frequencies of occurrence can be a function of the process used to populate a particular component. For example, a particular component may be predicted to have ten times more defects per million opportunities when populated using manual soldering than when populated using wave soldering.

Some embodiments can generate multiple possible design specifications having different assignments for manufacturing processes for some or all of the components of the circuit assembly. At block 648, embodiments calculate and report a yield prediction for each design specification (i.e., for each different set of manufacturing processes). For example, a first design specification is generated to have no critical process flow failures and no non-preferred process flows; and a second design specification is generated to have no critical process flow failures, but some non-preferred process flows. Still, the second design specification may ultimately be found to have a higher predicted yield.

Figure 7A:
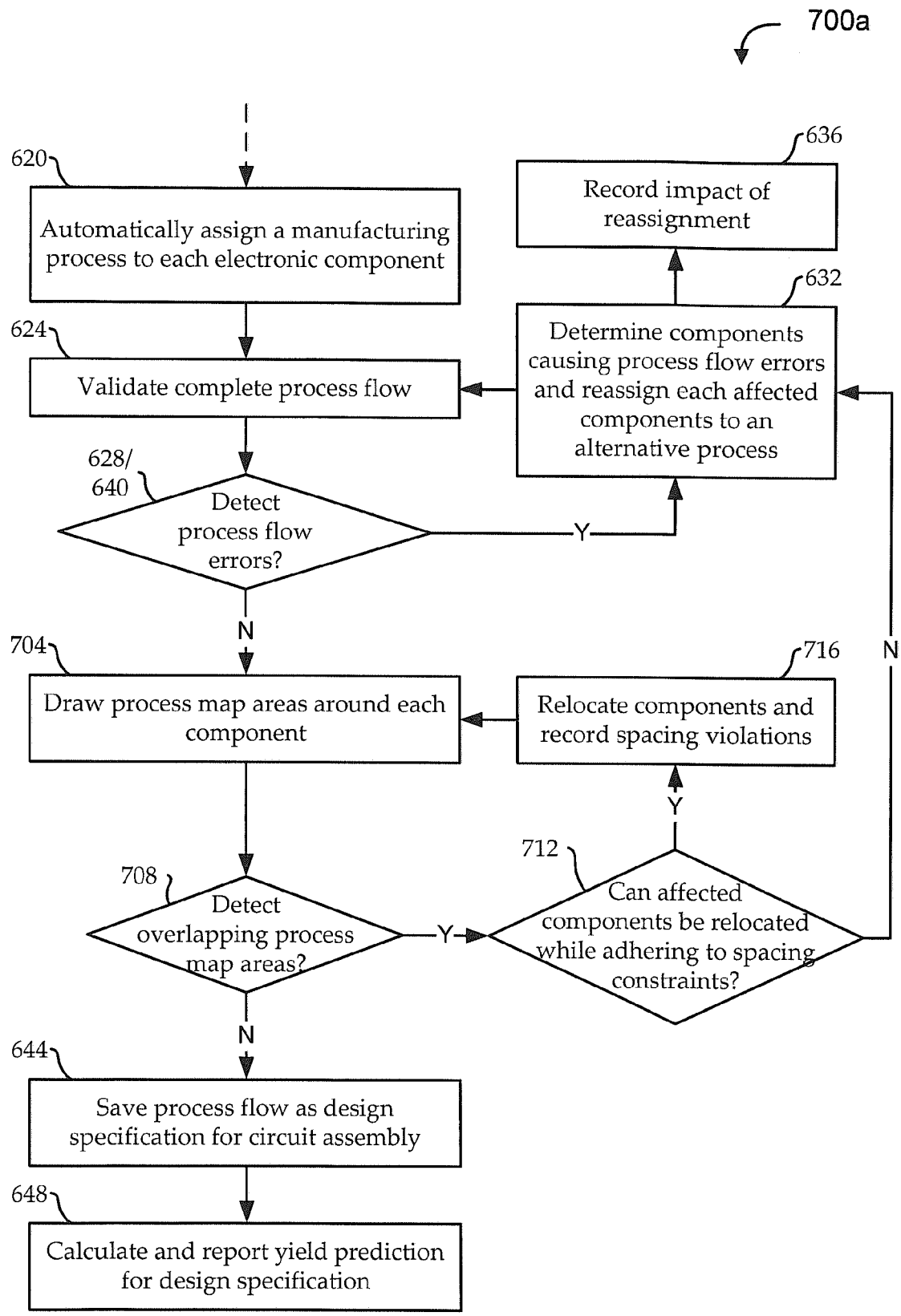
FIGS. 7A and 7B show flow diagrams of alternate illustrative methods for providing yield prediction functionality with respect to manufacturing process options, according to various embodiments.
Figure 7B:
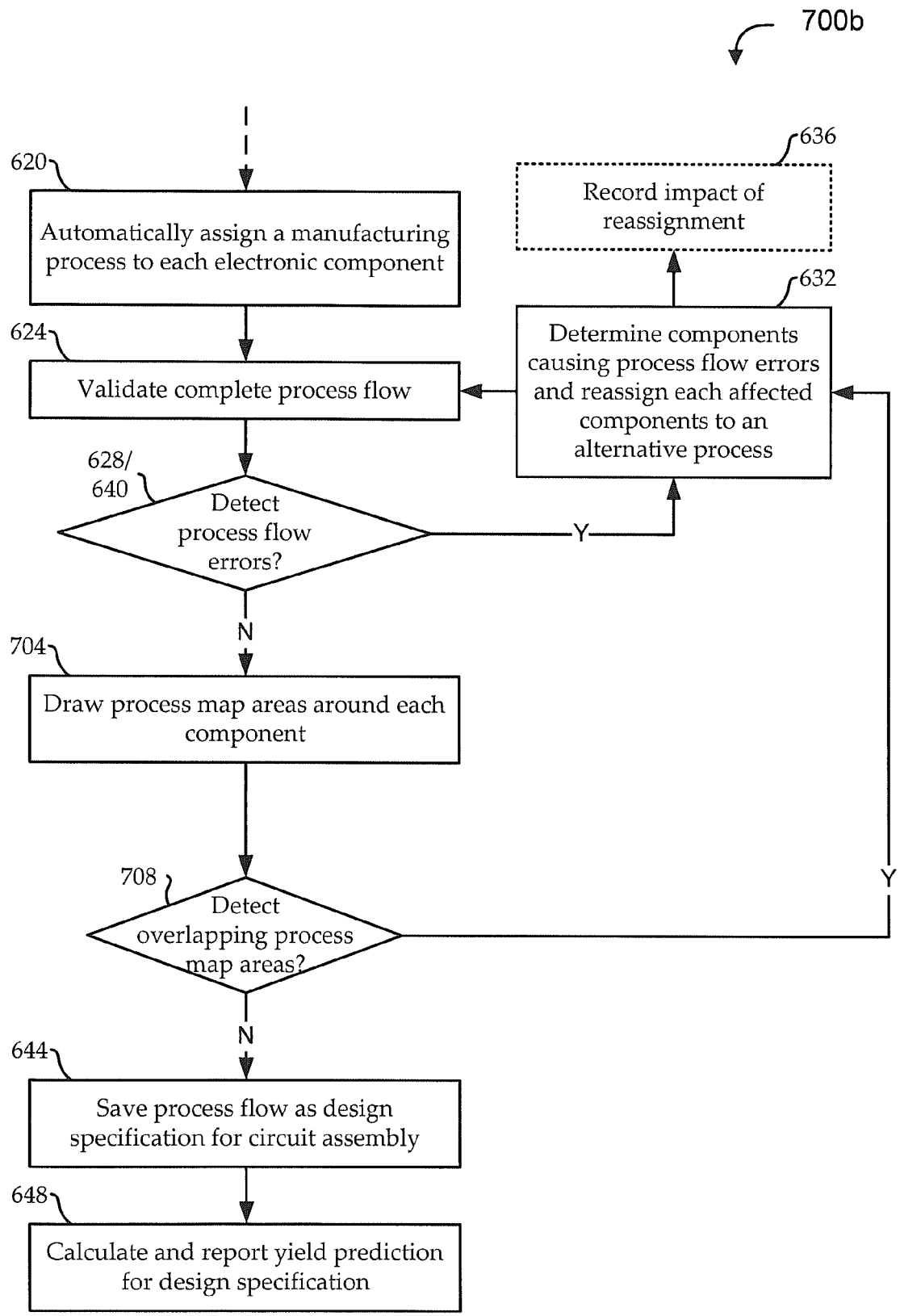

Some embodiments provide additional functionality. For example, FIGS. 7A and 7B show flow diagrams of alternate illustrative methods 700a and 700b, respectively. Each is illustrated in context of certain blocks of the method 600 of FIG. 6. In particular, it is assumed that a base process assignment is performed per component at block 620. Embodiments then iterate through blocks 624-640 to detect, try to handle (e.g., by reassignment), and record impacts of any critical or non-preferred process flow errors. However, having validated the process flow to that extent, embodiments may perform additional steps prior to accepting the flow as the design specification.

In some embodiments, at block 704, the yield prediction environment provides functionality to manually or automatically draw process map areas around each component. For example, a particular manufacturing process may specify a certain clearance around a component. At block 708, embodiments detect whether any of the process map areas overlap. If not, embodiments save the process flow as the design specification for the circuit assembly at block 644 and calculate and report a yield prediction for the design specification at block 648.

If overlapping process map areas are detected, a determination is made at block 712 as to whether affected components can be relocated while adhering to spacing constraints. If so, embodiments relocate those components and record spacing violations at block 716. If not, embodiments can treat the violation as a process flow error. Accordingly, the method 700*a* can return to handling (e.g., by reassignment), record impacts of, and revalidating any critical or non-preferred process flow errors according to blocks 624-640.

Turning to FIG. 7B and method 700*b*, similar functionality can be provided without allowing relocation. As in FIG. 7A, the yield prediction environment provides functionality to manually or automatically draw process map areas around each component at block 704, and embodiments detect whether any of the process map areas overlap at block 708. If not, embodiments save the process flow as the design specification for the circuit assembly at block 644 and calculate and report a yield prediction for the design specification at block 648. However, as illustrated, if overlapping process map areas are detected, no relocation is allowed. Instead, the only option is to treat the violation as a process flow error and to return to handling according to blocks 624-640.

The alternate embodiments of FIGS. 7A and 7B may be used at different stages of a design process. For example, at block 328 of FIG. 3, the final configuration of components may not be locked down, and relocation may be allowed. However, at block 336 of FIG. 3, the final configuration of components is locked down, but changes may still be allowed to the line configuration. Accordingly, embodiments may allow functionality of method 700*a* of FIG. 7A to be used at block 328, while only allowing functionality of method 700*b* of FIG. 7B to be used once at the design phase represented by block 336.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
identifying a design specification for a circuit assembly comprising a plurality of circuit components, each circuit component being populated in the circuit assembly according to the design specification;
for each of the plurality of circuit components:
identifying a set of component attributes corresponding to the circuit component according to an attribute database;
assigning a set of possible defects as a function of its respective set of component attributes, each of the set of possible defects being associated with a predicted frequency of occurrence, the predicted frequency of occurrence of at least one defect being a function of spacing or placement of the circuit component;
determining, according to the design specification, a predicted spacing or placement of the circuit component with respect to each of a plurality of form factors for the circuit assembly;
calculating a first predicted defect frequency of occurrence for the circuit component as a function of a first form factor for the circuit assembly; and
calculating a second predicted defect frequency of occurrence for the circuit component as a function of a second form factor for the circuit assembly;
calculating, using a processor, a first yield prediction for the circuit assembly corresponding to the first form factor as a function of the first predicted defect frequency of occurrence for each of the plurality of circuit components; and
calculating, using the processor, a second yield prediction for the circuit assembly corresponding to the second form factor as a function of the second predicted defect frequency of occurrence for each of the plurality of circuit components.

2. The method of claim 1, wherein the processor-readable instructions, when executed, cause the processor to perform the steps of, for each of the first and the second predicted defect frequencies, calculating the predicted defect frequency of occurrence for each circuit component as a function of the respective form factor for the circuit assembly comprises:
determining a placement of the circuit component in the circuit assembly according to the design specification;
calculating a predicted spacing for the circuit component as a function of the placement of the circuit component and the respective form factor of the circuit assembly; and
calculating the predicted defect frequency of occurrence for the circuit component as a function of the predicted spacing of the circuit component corresponding to the respective form factor for the circuit assembly.

3. The method of claim 1, further comprising:
determining a higher of the first yield prediction and the second yield prediction for the circuit assembly; and
determining a preferred form factor as the form factor corresponding to the higher of the first yield prediction and the second yield prediction.

4. The method of claim 3, further comprising:
updating the design specification for the circuit assembly according to the preferred form factor.

5. The method of claim 1, further comprising:
calculating a first predicted rework cost as a function of the first yield prediction for the circuit assembly; and
calculating a second predicted rework cost as a function of the second yield prediction for the circuit assembly.

6. The method of claim 1, wherein each of the plurality of circuit components is associated with a manufacturing process for populating the circuit component in the circuit assembly according to the design specification.

7. The method of claim 6, further comprising, for each of the plurality of circuit components:
mapping each of the set of possible defects to a step in the manufacturing process at which the defect is detectable; and
estimating, for each of the set of possible defects, a cost to remedy the defect.

8. The method of claim 7, further comprising:
calculating first and second predicted rework costs as a function of the first yield prediction and the second yield prediction for the circuit assembly, respectively, and as a function of the estimated costs to remedy the defects associated with the plurality of circuit components.

9. The method of claim 8, further comprising:
determining a lower of the first and second predicted rework costs; and
determining a preferred form factor as the form factor corresponding to the lower of the first and second predicted rework costs.

10. The method of claim 1, wherein the predicted frequency of occurrence of each of the set of possible defects is defined as a number of defects per million opportunities (DPMO).

11. The method of claim 1, wherein a manufacturing process associated with each circuit component is selected from the group consisting of a surface mount process, a wave soldering process, a manual soldering process, a gluing process, a curing process, a paste printing process, a reflow process, and a pin-in-paste process.

12. A system comprising:
a design subsystem configured to generate a design specification for a circuit assembly comprising a plurality of circuit components, each circuit component being populated in the circuit assembly according to the design specification; and
a yield prediction subsystem, configured, for each of the plurality of circuit components, to:
identify a set of component attributes corresponding to the circuit component according to an attribute database;
assign a set of possible defects as a function of its respective set of component attributes, each of the set of possible defects being associated with a predicted frequency of occurrence, the predicted frequency of occurrence of at least one defect being a function of spacing or placement of the circuit component;
determine, according to the design specification, a predicted spacing or placement of the circuit component with respect to each of a plurality of form factors for the circuit assembly;
calculate a first predicted defect frequency of occurrence for the circuit component as a function of a first form factor for the circuit assembly; and
calculate a second predicted defect frequency of occurrence for the circuit component as a function of a second form factor for the circuit assembly, wherein the yield prediction subsystem is further configured to:
calculate a first yield prediction for the circuit assembly corresponding to the first form factor as a function of the first predicted defect frequency of occurrence for each of the plurality of circuit components; and
calculate a second yield prediction for the circuit assembly corresponding to the second form factor as a function of the second predicted defect frequency of occurrence for each of the plurality of circuit components.

13. The system of claim 12, wherein the yield prediction subsystem is further configured, for each of the first and the second predicted defect frequencies, to calculate the predicted defect frequency of occurrence for each circuit component as a function of the respective form factor for the circuit assembly by:
determining a placement of the circuit component in the circuit assembly according to the design specification;
calculating a predicted spacing for the circuit component as a function of the placement of the circuit component and the respective form factor of the circuit assembly; and
calculating the predicted defect frequency of occurrence for the circuit component as a function of the predicted spacing of the circuit component corresponding to the respective form factor for the circuit assembly.

14. The system of claim 12, wherein the yield prediction subsystem is further configured to:
determine a higher of the first yield prediction and the second yield prediction for the circuit assembly; and
determine a preferred form factor as the form factor corresponding to the higher of the first yield prediction and the second yield prediction.

15. The system of claim 12, wherein the yield prediction subsystem is further configured to:
calculate a first predicted rework cost as a function of the first yield prediction for the circuit assembly; and
calculate a second predicted rework cost as a function of the second yield prediction for the circuit assembly.

16. The system of claim 12, wherein:
each of the plurality of circuit components is associated with a manufacturing process for populating the circuit component in the circuit assembly according to the design specification; and
the yield prediction subsystem is further configured to:
map each of the set of possible defects for each of the plurality of circuit components to a step in the manufacturing process at which the defect is detectable;
estimate, for each of the set of possible defects, a cost to remedy the defect;
calculate first and second predicted rework costs as a function of the first yield prediction and the second yield prediction for the circuit assembly, respectively, and as a function of the estimated costs to remedy the defects associated with the plurality of circuit components;
determine a lower of the first and second predicted rework costs; and
determine a preferred form factor as the form factor corresponding to the lower of the first and second predicted rework costs.

17. A computer program product residing on a non-transitory, processor-readable medium and having processor-readable instructions, which, when executed, cause a processor to perform steps comprising:
identifying a design specification for a circuit assembly comprising a plurality of circuit components, each circuit component being populated in the circuit assembly according to the design specification;
for each of the plurality of circuit components:
identifying a set of component attributes corresponding to the circuit component according to an attribute database;
assigning a set of possible defects as a function of its respective set of component attributes, each of the set of possible defects being associated with a predicted frequency of occurrence, the predicted frequency of occurrence of at least one defect being a function of spacing or placement of the circuit component;
determining, according to the design specification, a predicted spacing or placement of the circuit component with respect to each of a plurality of form factors for the circuit assembly;
calculating a first predicted defect frequency of occurrence for the circuit component as a function of a first form factor for the circuit assembly; and
calculating a second predicted defect frequency of occurrence for the circuit component as a function of a second form factor for the circuit assembly;
calculating a first yield prediction for the circuit assembly corresponding to the first form factor as a function of the first predicted defect frequency of occurrence for each of the plurality of circuit components; and
calculating a second yield prediction for the circuit assembly corresponding to the second form factor as a function of the second predicted defect frequency of occurrence for each of the plurality of circuit components.

18. The computer program product of claim 17, wherein the processor-readable instructions, when executed, cause the processor to perform the steps of, for each of the first and the second predicted defect frequencies, calculating the predicted defect frequency of occurrence for each circuit component as a function of the respective form factor for the circuit assembly by:

determining a placement of the circuit component in the circuit assembly according to the design specification;

calculating a predicted spacing for the circuit component as a function of the placement of the circuit component and the respective form factor of the circuit assembly; and calculating the predicted defect frequency of occurrence for the circuit component as a function of the predicted spacing of the circuit component corresponding to the respective form factor for the circuit assembly.

19. The computer program product of claim 17, wherein the processor-readable instructions, when executed, cause the processor to perform steps further comprising:

determining a higher of the first yield prediction and the second yield prediction for the circuit assembly; and determining a preferred form factor as the form factor corresponding to the higher of the first yield prediction and the second yield prediction.

20. The computer program product of claim 17, wherein the processor-readable instructions, when executed, cause the processor to perform steps further comprising:

calculating a first predicted rework cost as a function of the first yield prediction for the circuit assembly;

calculating a second predicted rework cost as a function of the second yield prediction for the circuit assembly; and determining a preferred form factor as the form factor corresponding to the lower of the first predicted rework cost and the second predicted rework cost.

\* \* \* \* \*